United States Patent [19]
Cho

[11] Patent Number: 5,978,452
[45] Date of Patent: Nov. 2, 1999

[54] VOICE DATA RECORDING AND TRANSMITTING METHOD AND APPARATUS FOR FACSIMILE LINKED TO PERSONAL COMPUTER

[75] Inventor: Gyo-O Cho, Suwon, Rep. of Korea

[73] Assignee: SamSung Electronics Co., Ltd., Kyungki-do, Rep. of Korea

[21] Appl. No.: 08/834,816

[22] Filed: Mar. 31, 1997

[30] Foreign Application Priority Data

Mar. 30, 1996 [KR] Rep. of Korea .......................... 96-9612

[51] Int. Cl.$^6$ ....................................... H04M 1/64
[52] U.S. Cl. ................................. 379/88.24; 379/102.01
[58] Field of Search ............................... 379/88.22, 88.23, 379/88.24, 90.01, 93.07, 100.01, 100.02, 100.16, 93.17, 93.26, 102.01, 67.1, 74, 77

[56] References Cited

U.S. PATENT DOCUMENTS

| | | | |
|---|---|---|---|
| 4,847,891 | 7/1989 | Kotani | 379/88.11 |
| 4,908,851 | 3/1990 | Kotani et al. | . |
| 4,922,524 | 5/1990 | Baba et al. | . |
| 5,086,455 | 2/1992 | Satomi et al. | 379/100.16 |
| 5,131,026 | 7/1992 | Park | 379/100.16 |
| 5,255,311 | 10/1993 | Yoshida | . |
| 5,282,242 | 1/1994 | Hachinoda | . |
| 5,289,532 | 2/1994 | Ishikawa et al. | . |
| 5,333,179 | 7/1994 | Yamamoto et al. | 379/67.1 |
| 5,337,349 | 8/1994 | Furohashi et al. | 379/100.14 |
| 5,337,350 | 8/1994 | Kuwahara | 379/100.16 |
| 5,412,710 | 5/1995 | Tanaka | 379/88.13 |
| 5,452,289 | 9/1995 | Sharma et al. | 370/286 |
| 5,459,584 | 10/1995 | Gordon et al. | 358/434 |
| 5,483,580 | 1/1996 | Brandman et al. | 379/88.13 |
| 5,487,105 | 1/1996 | Sakai | 379/100.16 |
| 5,579,127 | 11/1996 | Kaneko | . |

*Primary Examiner*—Scott Weaver
*Attorney, Agent, or Firm*—Robert E. Bushnell, Esq.

[57] ABSTRACT

A method of recording a voice signal in a facsimile system having a telephone handset linked to a personal computer, including the steps of: receiving the voice signal from telephone lines connected to a public switched telephone network during a voice communication mode; converting the voice signal into voice data and transmitting the voice data to the personal computer linked to the facsimile system; and filing and storing the voice data in an auxiliary memory of the personal computer.

5 Claims, 4 Drawing Sheets

VOICE DATA RECORDING AND TRANSMITTING METHOD AND APPARATUS FOR FACSIMILE LINKED TO PERSONAL COMPUTER

CLAIM FOR PRIORITY

This application makes reference to, incorporates the same herein, and claims all benefits accruing under 35 U.S.C. §119 from an application for Voice Data Recording And Transmitting Method For Facsimile Linked To Personal Computer earlier filed in the Korean Industrial Property Office on Mar. 30, 1996 and there duly assigned Serial No. 9612/1996.

BACKGROUND OF THE INVENTION

1. Technical Field

The present invention generally relates to a facsimile system having a voice data recording and transmission function, and more particularly, relates to a voice data recording and transmitting method for a facsimile unit which is linked to a personal computer.

2. Related Art

Generally, a facsimile system having facsimile and telephone functions as disclosed, for example, in U.S. Pat. No. 4,908,851 for Facsimile Apparatus Operable In Facsimile Or Conversation Mode issued to Kotani et al., U.S. Pat. No. 5,255,311 for Data Communication Apparatus issued to Yoshida, U.S. Pat. No. 5,337,349 for Image Telecommunication Apparatus issued to Furohashi et al., U.S. Pat. No. 5,337,350 for Facsimile Apparatus With Telephone System issued to Kuwahara, and U.S. Pat. No. 5,487,105 for Facsimile Apparatus Operable In Facsimile Or Telephone Mode issued to Sakai, is well known in the communication art for selectively operating either in a facsimile mode or in a telephone mode. Other facsimile systems as disclosed, for example, in U.S. Pat. No. 5,086,455 for Facsimile Arrangement Having Automatic Answering Telephone Set And Facsimile Set And Switching Process Therefor issued to Satomi et al., U.S. Pat. No. 5,131,026 for Facsimile System Having Auto-Answering Function issued to Park, and U.S. Pat. No. 5,333,179 for Facsimile Apparatus With Automatic Answering Telephone Function issued to Yamamoto et al., are constructed with an automatic telephone answering device for recording a voice message from a calling subscriber when a user is not in the vicinity of the facsimile system to answer an incoming call.

In such a facsimile system, the telephone answering device typically incorporates therein an audio recorder and related circuitry adapted for connection to local telephone lines and to the base station of the telephone. The magnetic tape recorder is programmed so that if the user does not pick up his telephone from the base station of the facsimile system during a given number of ringing bursts announcing an incoming call, a pre-recorded voice message will be sent to the caller, asking the caller to leave his/her message. After that, voice message of the caller is recorded on an audio cassette tape or semiconductor memory device depending upon whether the audio recorder is an analogue or a digital system. Voice message can also be transmitted in conjunction with image data as disclosed in, for example, U.S. Pat. No. 4,922,524 for Facsimile System With A Voice Transmission Function issued to Baba et al., U.S. Pat. No. 5,289,532 for Facsimile Apparatus With Providing Facsimile Transmission With Forwardable Voice Communication issued to Ishikawa et al., U.S. Pat. No. 5,412,710 for Facsimile Machine Capable Of Transmitting Voice Messages issued to Tanaka.

Generally, the facsimile system's control unit periodically checks if a ring signal is received from standard telephone lines of a public switched telephone network (PSTN). When the ring signal is received from the telephone lines and a calling tone (CNG) indicating that a document is being sent from another facsimile system according to a predetermined protocol recommended by the International Telegraph and Telephone Consultative Committee CCITT.30, the facsimile system receives image data in a document reception mode. At this point, a communication path is not established between the facsimile system and the telephone handset connected thereto but between a modem installed in the facsimile system and the standard telephone lines of the PSTN. Thus, if the user does not pick up the telephone connected to the facsimile system during a predetermined number of ringing bursts, an automatic answering mode is established in the facsimile system, and the user's pre-recorded voice message is sent to the caller. The caller then leaves a voice message which is, in turn, recorded on the audio cassette tape or semiconductor memory device. The link access protocol for data communications between the facsimile systems as recommended by CCITT. 30 is realized through four phases. That is, the communication line is first established between the receiving and transmitting facsimile systems, and after the CNG tone is sent to the receiving facsimile system, the receiving subscriber supplies a called station identification to the transmitting subscriber in the first phase. In the second phase, the receiving subscriber transmits a capacity identification to the transmitting subscriber, the transmitting subscriber sends command information and a phase/training signal to the receiving subscriber, and the receiving subscriber sends a ready-to-receive confirmation signal CFR. The caller's message is sent to the transmitting facsimile system at a preset communications speed in the third phase. In case that the message transmission is completed, the transmitting set sends an END signal of message transmission to the receiving subscriber, and the receiving subscriber sends a confirmation signal to the transmitting subscriber in the fourth phase.

In the conventional facsimile system having an automatic telephone answering function, the capacity of a voice storage medium into which incoming voice message is recorded is relatively small, and there is a time limit relating to the automatic telephone answering function. For instance, if the user of the telephone handset as incorporated in the facsimile system is absent for a long time period, there is no way to modify the user's voice message to be sent to several different people. Moreover, in case where the callers leave many voice messages, and the voice storage medium is full with voice messages, a new voice message cannot be recorded on the storage medium and is therefore lost at the time when voice communication is established.

SUMMARY OF THE INVENTION

Accordingly, it is therefore an object of the present invention to provide a facsimile system having an improved voice data recording and transmitting function.

It is also an object to provide a voice data recording and transmitting method for a facsimile system which allows recording of incoming voice messages even if the incoming voice messages in a voice communication mode exceeds the capacity of its storage medium.

These and other objects of the present invention can be achieved by a method of storing a voice signal in a facsimile system having a telephone handset linked to a personal computer and transmitting the signal to a user, including the steps of receiving the voice signal from telephone lines connected to a public switched telephone network during a voice communication mode; converting the voice signal into voice data and transmitting the voice data to the personal computer linked to the facsimile system; filing and storing the voice data in an auxiliary memory of the personal computer; and when a prescribed signal is received from the user through the telephone line, converting the voice data recorded in the auxiliary memory of the personal computer into an analog voice signal for transmission to the user.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
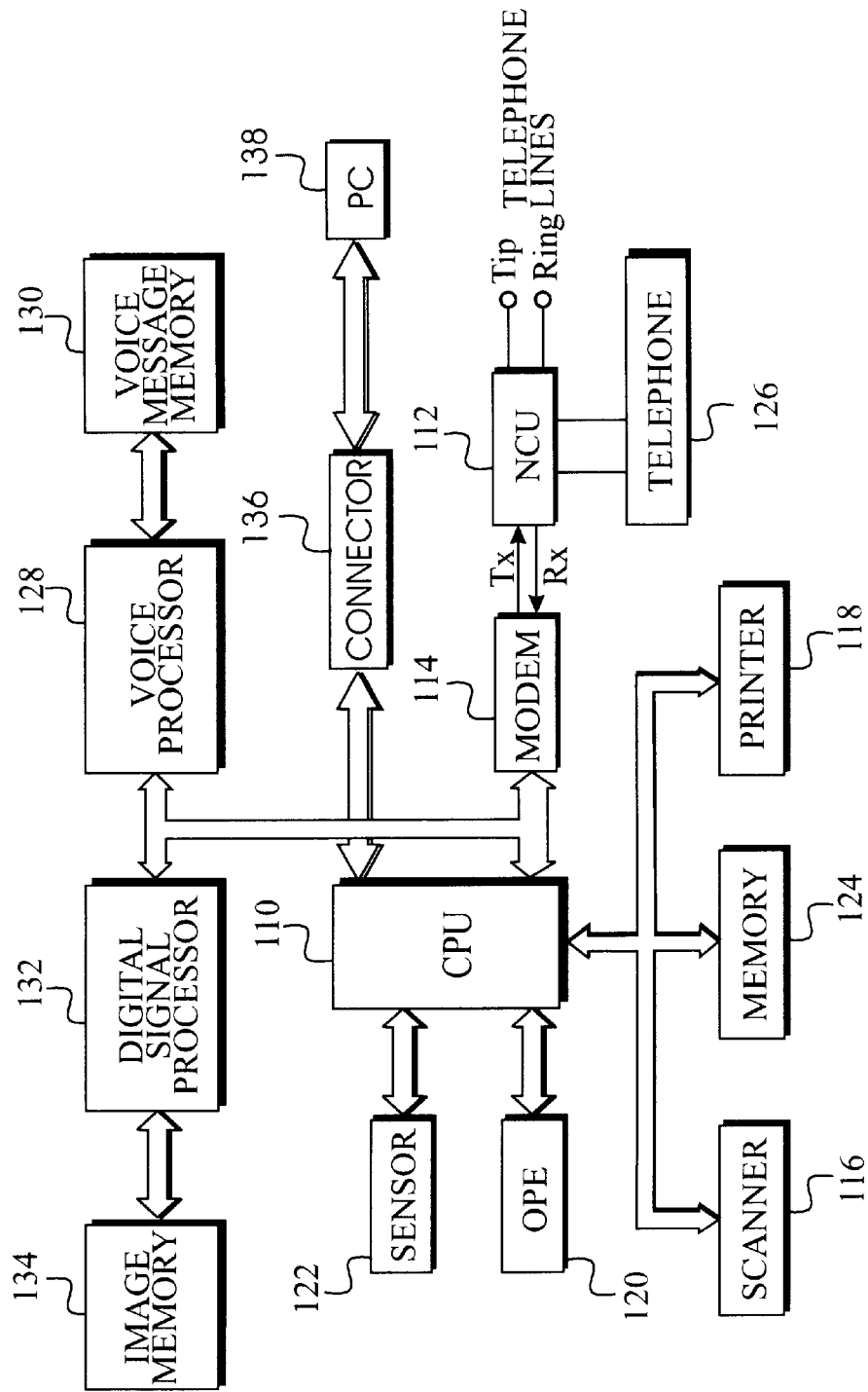
FIG. 1 is a block diagram of a facsimile system linked to a personal computer according to the principles of the present invention.

Referring now to the drawings and particularly to FIG. 1, which illustrates a facsimile system linked to a personal computer (PC) according to the principles of the present invention. The facsimile system includes a central processing unit (CPU) 110 for controlling operations of the facsimile system, a network control unit (NCU) 112 connected to a tip and ring terminal of standard telephone lines of a public switched telephone network (PSTN), a modem 114, scanner 116, a printer 118, an operational panel OPE 120, a sensor 122, a memory 124, a telephone 126 having a speaker and a microphone connected in parallel to the NCU 112, a PC 138 linked to the facsimile system through a connector 136, and optionally a voice processor 128, a voice message memory 130, a digital signal processor 132, and an image memory 134.

The memory 124 includes a program memory such as a ROM (not shown) which stores programs for the CPU 110 to control the general operation of the facsimile system for transmission or reception of image data from another communication system such as a telephone or a remote facsimile system, a data memory such as a RAM (not shown) which temporarily stores a variety of items of information. The operational panel (OPE) 120 includes a key input unit comprising a plurality of alpha-numeric keys and function keys that are independently operable by manual depression to provide key data to the CPU 110 to dial a telephone number of a counterpart communication system, and a display unit in a form of a liquid crystal display for continuously providing a visual display of data indicating various modes of operations of the facsimile system. The sensor 122 senses whether a document is input into the facsimile system, or whether copy paper is stored and available for use, and generates an indicative signal to the CPU 110. The scanner 116 transports and scans an image of the input document and then generates image data corresponding to the scanned image. The image data output from the scanner 116 is then processed for either transmission via a telephone line or for copy during the copy mode under control of the CPU 110. The printer 118 prints the processed image data received from the CPU 110 on a printable medium such as individual cut sheets of paper during the reception mode and the copy mode under the control of the CPU 110. The modem 114 modulates the processed image data output from the CPU 110 into a modulated image signal for transmission, and duplicates the image signal input to the CPU 110 during the reception mode under the control of the CPU 110. The NCU 112 is connected with tip and ring terminals of the standard telephone lines to form transmission and reception paths for the modem 114 under the control of the CPU 110. The telephone 126 having a speaker and a microphone is connected in parallel to the NCU 112 to allow voice communication under the control of the CPU 110. The PC 138 is connected to the CPU 110 through the connector 136 which allows the CPU 110 to control recording of the user's voice message for greeting the caller in the event the user does not want or is unable to answer an incoming call, and to control recording of the caller's voice message in an auxiliary memory such as a hard disk of the PC 138.

Optionally, the voice processor 128, the voice message memory 130, the digital processor 132, and the image memory 134 are included to initially rely upon the facsimile system to store the user's voice message and the callers' voice messages first in its internal memory in a form of a voice message memory 130 before sending the overflow of voice messages from the voice message memory 130 to an auxiliary memory such as a hard disk of the PC 138 for storage. When the voice processor 128 and the voice message memory 130 are included in the facsimile system, the display unit of the OPE 120 is configured to provide a visual display of data reflecting an overflow of voice messages contained in the voice message memory 130 and the overflow is forwarded to an auxiliary memory such as a hard disk of the PC 138. Voice message memory 130 is used to store a voice message in a form of digital or analog data recorded by the user to alert the caller that the user is absent from the vicinity of the facsimile system and to ask the caller to record any voice message the caller has for the user in a voice communication mode. The voice processor 128 synthesizes the voice message stored in the voice message memory 130 to a voice signal under the control of the CPU 110 to thereby output the same to the caller via the PSTN. In addition, the voice processor 128 also processes the voice message received from the caller into digital or analog data to thereby store the same in the voice message memory 130 for subsequently alerting the user of the recorded voice message from the caller. The digital signal processor 132 encodes/decodes image data outputted from the scanner 116 or received image data. The image memory 134 is used to store image data from another facsimile system for later print out if a delay mode is initiated from the OPE 120. In a preferred embodiment of the present invention, the message memory 124, the voice memory 130 and the image memory 134 may be collectively embodied in a single memory device.

Figure 2:
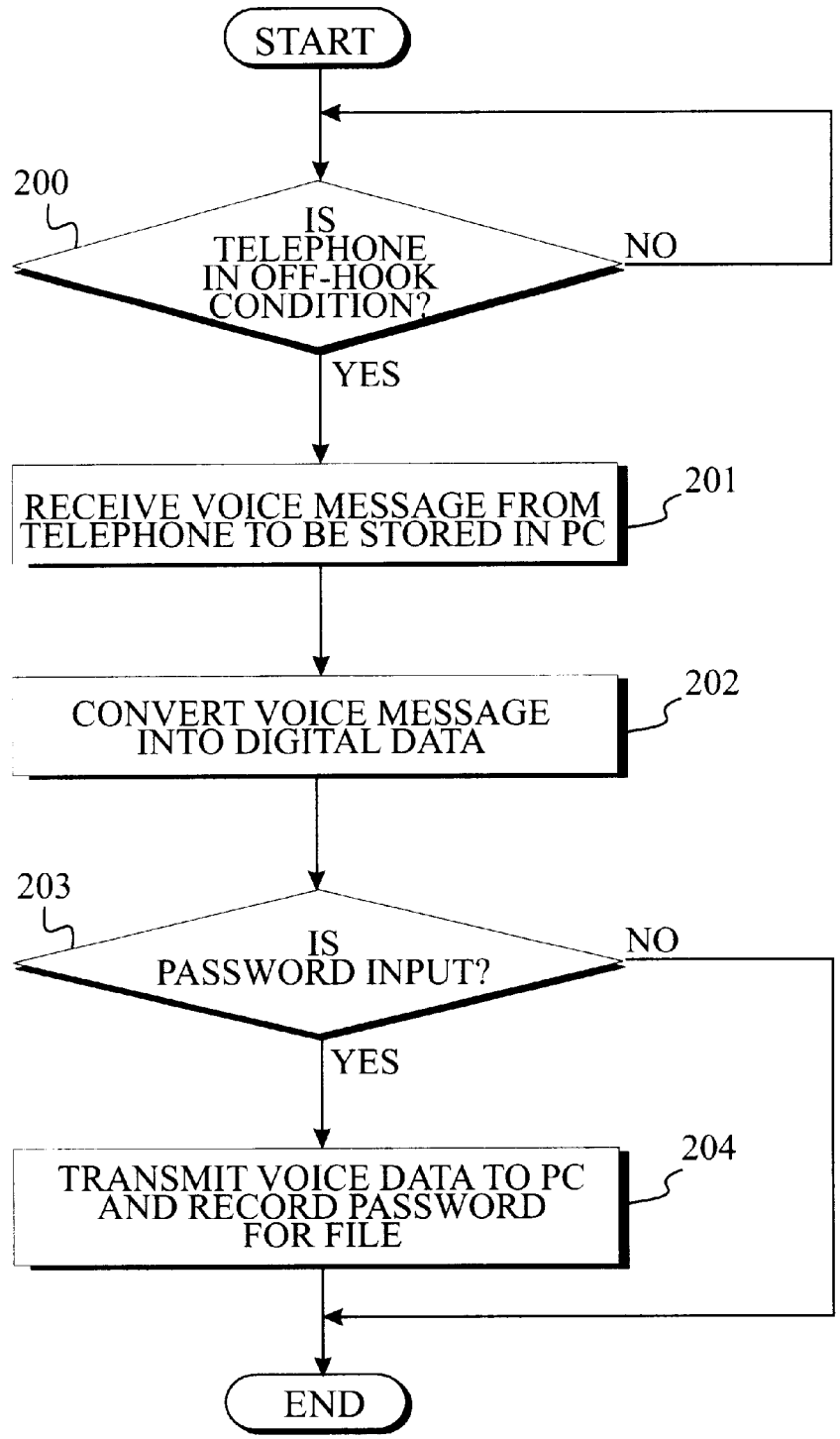
FIG. 2 is a flow chart illustrating a control sequence of a voice message recording mode in the facsimile system constructed according to the principles of the present invention.

Turning now to FIG. 2 which illustrates a control sequence of a voice message recording mode of the facsimile system having a telephone handset 126 linked to the PC 138 as shown in FIG. 1 without passing through the PSTN. A voice message recording mode is initiated when the user wants to record a personal voice message greeting the caller in the event the user does not want or is unable to answer the incoming call. The control sequence begins with determining whether the telephone 126 is in an off-hook condition at step 200, that is when the user picks up the telephone handset 126 in a recording mode. When the telephone 126 is in an off-hook condition and the user enters a personalized voice message, the CPU 110 of the facsimile system receives the voice message from the telephone 126 to be stored in the PC 138 at step 201. The CPU 110 then controls the modem 114 and converts the voice message into digital voice data at step 202. After the voice message is converted into voice data, the CPU 110 determines whether a predetermined password is input at step 203. If there is no input password at step 203, the voice message recording mode is terminated. However, if there is an input password at step 203, the CPU 110 transmits the voice data to the PC 138 for storage in an auxiliary memory device via the connector 136 and records the password for file at step 204. As a result, the user's voice message is recorded and filed in the auxiliary memory of the PC 138 to be reproduced or played back through the connector 136 in response to certain conditions of an incoming call.

Figure 3:
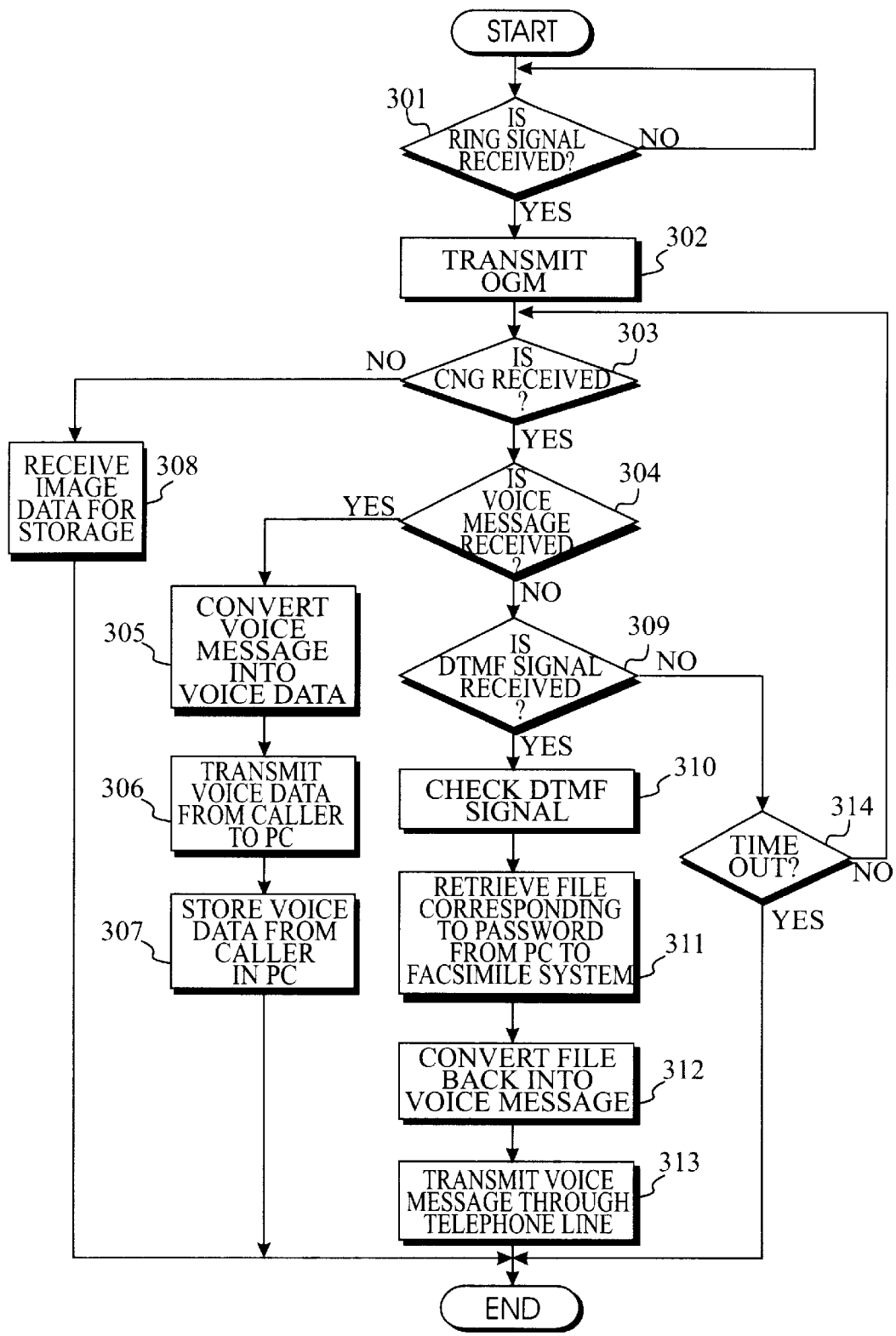
FIG. 3 is a flow chart illustrating a control sequence of a facsimile mode of operation in the facsimile system constructed according to the principles of the present invention.

FIG. 3 illustrates a control sequence of the facsimile system operable in a document reception mode, and voice data recording and transmission through standard telephone lines connected to PSTN in response to an incoming call. Steps 301, 302 and 308 reflects the steps necessary for document reception in response to an incoming call. Steps 304–307 reflects the steps necessary for recording the caller's voice message in an auxiliary memory of the PC 138. Steps 309–313 reflects the steps necessary for the user from a remote location to listen to voice messages previously recorded in the auxiliary memory of the PC 138.

First, the CPU 110 determines whether a ring signal is received from the standard telephone lines of the PSTN indicating an incoming call at step 301. When the ring signal is received from the telephone lines, the CPU 110 controls the transmission of an OGM signal to the caller's communication system (which can be another facsimile system or a telephone) at step 302. Next the CPU 110 determines whether a calling tone CNG is received from the caller's communication system at step 303. When the CNG signal is received from the caller's communication system, image data is received from the caller's communication system to be stored in the image memory 134 at step 308. However, when the CNG signal is not received from the caller's communication system, the CPU 110 determines whether a voice message is received from the caller at step 304. If the voice message is received from the caller, the CPU 110 converts the voice message received from the caller into digital voice data at step 305, and transmits the voice data from the caller to the PC 138 at step 306 where the voice data can be stored in an auxiliary memory at step 307.

If, on the other hand, the voice message is not received from the caller at step 304, the CPU 110 determines whether a dual-tone multi-frequency DTMF signal is received from the caller at step 309. Here, the DTMF signal represents a password input from the caller indicating that the caller is, in fact, the owner of the facsimile system who wants to access the PC 138 to listen to all voice messages previously recorded in the auxiliary memory of the PC 138 from a remote location. After the DTMF signal is received from the caller, the CPU 110 verifies the DTMF signal at step 310 in order to request retrieval of files corresponding to the input password from the PC 138 to the facsimile system at step 311. When the files are sequentially retrieved from the PC 138, the CPU 110 converts the file information back into voice messages at step 312, and then transmits the voice message previously recorded by previous callers through the standard telephone lines at step 313 to inform the caller who is the owner of the facsimile system of all the voice messages left for the caller by other callers.

Figure 4:
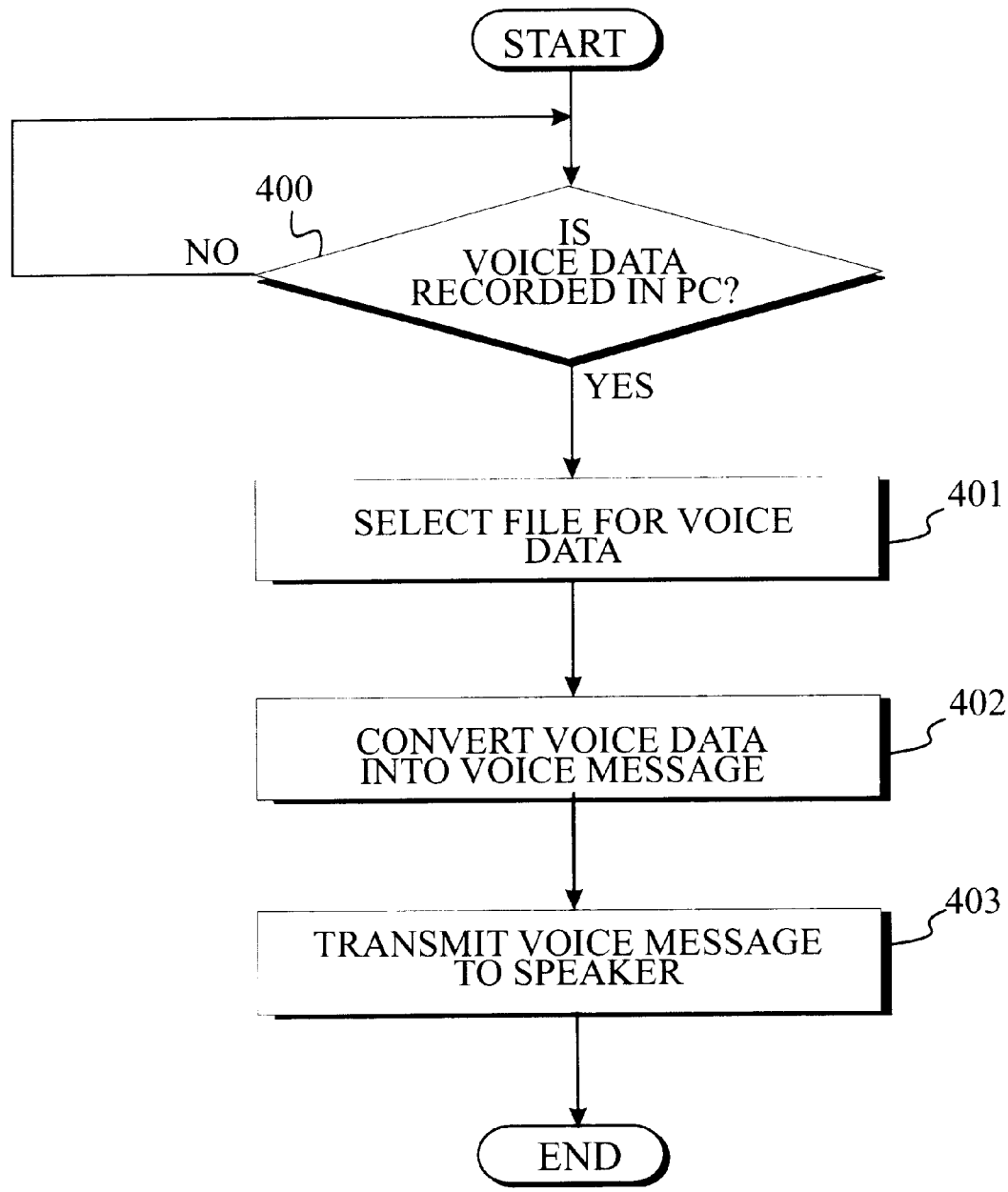
FIG. 4 is a flow chart illustrating a control sequence of a voice message transmission in the facsimile system constructed according to the principles of the present invention.

Refer now to FIG. 4 which illustrates a control sequence of a voice message transmission in the facsimile system when the user is physically located at the facsimile system and commands via the OPE 120 the facsimile system to inform the user of all the voice messages recorded from other callers. Here, the display unit of the OPE 120 provides a visual display of such information. At step 400, the CPU 110 determines whether voice message in digital format is recorded in the auxiliary memory of the PC 138. If voice data is recorded in the auxiliary memory of the PC 138, the CPU 110 controls the selection of file corresponding to the voice data at step 401 and conversion of the voice data into voice message at step 402 and then the transmission of the voice message to the speaker of the telephone 126 to inform the user of all the voice messages previously recorded by other callers at step 403.

If the optional voice processor 128 and voice message memory 130 are included in the facsimile system, then the CPU 110 determines whether a voice message in digital format is recorded in the voice message memory 130 rather than the PC 138 at step 400. If voice data is recorded in the voice message memory 130, the CPU 110 controls the selection of file corresponding to the voice data at step 401 and conversion of the voice data into voice message at step 402 and then the transmission of the voice message to speaker of the telephone 126 to inform the user of all the voice messages previously recorded by other callers at step 403.

As described above, even if the quantity of voice messages received in a voice communication mode of the facsimile system exceeds the capacity of its storage medium, voice data can still be stored in the facsimile system and safely transmitted to the user.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of recording and retrieving a voice signal in a facsimile system having a telephone handset linked to a personal computer, comprising the steps of:

receiving the voice signal from telephone lines connected to a public switched telephone network during a voice communication mode;

converting the voice signal into voice data and transmitting the voice data to the personal computer linked to the facsimile system;

filing and storing the voice data in an auxiliary memory of the personal computer; and transmitting each said voice signal to a user at a remote location when a prescribed dual tone multi-frequency signal is received from the remote location through the telephone lines to inform the user of each voice signal previously recorded as corresponding voice data in the auxiliary memory of the personal computer after converting said corresponding voice data previously recorded in the auxiliary memory back into an analog voice signal.

2. The method as claimed in claim 1, further comprising the step of permitting a user to directly record a voice signal corresponding to an audible message greeting a caller from the telephone lines connected to said public switched telephone network in said auxiliary memory of the personal computer through the telephone handset connected to said facsimile system.

3. A communication system, comprising:

a facsimile system having a telephone handset;

a computer system having an auxiliary memory communicatively linked to said facsimile system; and said facsimile system further comprising:

an operational panel including a keyboard comprising a plurality of discrete keys that are independently operable by manual depression by a user to control operation of said facsimile system, and a display unit for providing a visual display of the operation of said facsimile system;

input means coupled to tip and ring terminals of telephone lines connected to a public switched telephone network, for receiving an incoming call from a caller; and controller means for controlling recording of a greeting voice message from a user directly from said telephone handset to greet the caller in said auxiliary memory of said computer system, for recording of at least one voice message from at least one caller from the telephone lines connected to said public switched telephone network in said auxiliary memory of said computer system, and for playing back of the at least one voice message from the at least one caller previously recorded in the auxiliary memory of the computer system upon request from the user, wherein said controller means plays back the at least one voice message previously recorded in the auxiliary memory of said computer system through the telephone lines connected to said public switched telephone network when the user from a remote location inputs a password through the telephone lines connected to said public switched telephone network, and wherein said controller means plays back the at least one voice message previously recorded in the auxiliary memory of said computer system through the telephone handset when the user inputs a command via said operational panel.

4. A method of recording and retrieving a voice signal in a facsimile system having a telephone handset linked to a personal computer, comprising the steps of:

receiving the voice signal from telephone lines connected to a public switched telephone network during a voice communication mode;

converting the voice signal into voice data and transmitting the voice data to the personal computer linked to the facsimile system;

filing and storing the voice data in an auxiliary memory of the personal computer; and playing back a voice signal corresponding to the voice data previously recorded in the auxiliary memory of said personal computer through the telephone handset, when a user inputs a command via an operational panel of the facsimile system.

5. The method as claimed in claim 1, further comprising the step of permitting a user to directly record a voice signal corresponding to an audible message greeting a caller from the telephone lines connected to said public switched telephone network in said auxiliary memory of the personal computer through the telephone handset of said facsimile system.

* * * * *